US006697067B1

(12) United States Patent
Callahan et al.

(10) Patent No.: US 6,697,067 B1
(45) Date of Patent: Feb. 24, 2004

(54) METHOD AND SYSTEM FOR STORING INFORMATION REGARDING A SELECTED VIEW OF A THREE DIMENSIONAL IMAGE GENERATED FROM A MULTI-FRAME OBJECT

(75) Inventors: Terrance Callahan, Aurora (CA); Aaron B. Boxer, Toronto (CA)

(73) Assignee: Cedera Software Corp., Mississauga (CA)

( * ) Notice: Subject to any disclaimer, the term of this patent is extended or adjusted under 35 U.S.C. 154(b) by 0 days.

(21) Appl. No.: 09/406,711

(22) Filed: Sep. 28, 1999

(51) Int. Cl.[7] ............................................... G06T 17/00
(52) U.S. Cl. ....................................................... 345/427
(58) Field of Search ................................ 345/419, 422, 345/424, 426, 427

(56) References Cited

U.S. PATENT DOCUMENTS

| | | |
|---|---|---|
| 5,454,371 A | 10/1995 | Fenster et al. |
| 5,562,095 A | 10/1996 | Downey et al. |
| 5,671,353 A | 9/1997 | Tian et al. |
| 6,429,861 B1 | 8/2002 | Hossack et al. ............ 345/419 |

FOREIGN PATENT DOCUMENTS

WO    WO98/16903    4/1998

OTHER PUBLICATIONS

Diallo, B. "Conception, réalisation et exploitation d'une base de donnés en neuroimagerie cognitive", Dec. 2/98, pp. 151, 152, 154–161, 208, 210. (Thése de doctorat de L'Université de Caen).

Primary Examiner—Almis R. Jankus

(57) ABSTRACT

A method of storing and restoring for replay a selected view from a series of views of a three dimensional image generated from an image object. The three dimensional image is generated in an image coordinate set of a coordinate space, and is configurable to sequentially make each view in the series of views viewable. Each view in the series of views has an associated configuration. The method comprises selecting a view from a series of views, storing an object unique identifier for the image object, storing the associated configuration for the selected view of the three dimensional image, retrieving the object unique identifier, retrieving the image object using the object unique identifier, retrieving the associated configuration for the selected view of a three dimensional image, generating the three dimensional image in the coordinate space from the image object, and configuring the three dimensional image to have the associated configuration for the selected view to make the selected view viewable.

23 Claims, 10 Drawing Sheets

| | |
|---|---|
| 1 | Start – goto 2 |
| 2 | Initialize:Initialize model coordinates, window coordinates and ordered image data and mappings between Each.<br>Initialize modelPoly – clip state includes 6 faces and 8 vertices of a parallelepiped (modelPoly)<br>R, S and T matrices are initialized such that there is no rotating, scaling or translating of winPoly Relative to modelPoly<br>Set of interesting coordinates is initially empty Goto 3 |
| 3 | Apply R, S and T matrices to modelPoly to generate the winPoly<br>Goto 4 |
| 4 | One-to-one project the winPoly onto the x-y coordinates. Use the raster and data submodules to fill all Visible surfaces with data corresponding to the integer points inside the surface Goto 5 |
| 5 | Display the filled surface on the screen and select desired action:<br>Rotate — Goto 6<br>Scale — Goto 7<br>Translate — Goto 8<br>Slice — Goto 9<br>Pivot — Goto 10<br>Select a point of interest? — Goto 11<br>Exit — Goto 15 |
| 6 | Rotate winPoly by multiplying the rotation matrix R by a suitable transformation matrix Goto 3 |
| 7 | Scale winPoly by multiplying the scaling matrix S by a suitable transformation matrix. Goto 3 |
| 8 | Translate winPoly by multiplying the translation matrix T by a suitable transformation matrix. Goto 3 |
| 9 | Translate a visible face along its normal (slicing)<br>Goto 14 and modify clip state by adding face (and by subtracting starting surface if starting surface is not One of the initial 6 faces) |
| 10 | Pivot a visible surface about any point on the surface (this is only an option if this surface is not one Of the initial 6 faces)<br>Goto 14 and modify clip state by adding new surface, and deleting starting surface |
| 11 | For the point selected, determine corresponding coordinates of interests and add these coordinates to the set Of interesting coordinates. If there are at least two coordinates in the set of interesting coordinates then goto 12. Otherwise goto 5 |
| 12 | Generate optimal surface. If yes then goto 13. If no, then goto 5 |
| 13 | Determine optimal surface containing at least two coordinates of interest by executing the pseudo code steps of Figure 3. Then automatically perform actions of steps 6 to 10 as required to render optimal surface visible.<br>Goto 14 to update clip state. |
| 14 | Modify modelPoly by cutting to reveal new surface. Add new surface to clip state. Goto 3 |
| 15 | Exit |

FIG. 4

C. PSEUDO CODE 1  3 POINT PLANE GENERATION

VECTOR: autoPts[3];

VECTOR temp1 = autoPts[1] – autoPts[0];   // first vector in the plane
VECTOR temp2 = autoPts[2] – autoPts[0];   // seconde vector in the plane VECTOR normal = temp1 * temp2    // take the cross product to get the normal ////////////////////////////////////////////////////////////////////////////////
// for a vector (x, y, z) and normal vector (A, B, C) the plane equation is:
// D = A = x + B * y + C * z float D = normal.x * autoPts[0].x + normal.y * autoPts[0].y + normal.z * auotPts[0].z;

Plane P = plane(normal.D);

AddPlaneToCube(P);

RenderIntoBuffer();

2  2 POINT PLANE GENERATION

VECTOR: autoPts[3];
VECTOR temp1 = autoPts[1] – autoPts[0];   // first vector in the plane ScaleNormalFromAxis(temp1);          // calculate normal with y component equal to zero ////////////////////////////////////////////////////////////////////////////////
// for a vector (x, y, z) and normal vector (A, B, C) the plane equation is:
// D = A = x + B * y + C * z float D = normal.x * autoPts[0].x + normal.y * autoPts[0].y + normal.z * auotPts[0].z;

Plane P = plane(normal.D);

AddPlaneToCube(P);

RenderIntoBuffer();

FIG. 5

////////////////////////////////////////////////////////////////////////////////
//TYPES
A FLOAT is a floating-point number (decimal).

An INTEGER is an integer.

A MATRIX is a 4x4 transformation matrix.

A VECTOR is a floating point vector in 3 dimensions.

A PLANE is a plane satisfying the equation $Ax + By + Cz + D = 0$.

A FACE is a set of n points on a given PLANE, with $n >= 3$.

A DICOM_IMAGE is a DICOM image

////////////////////////////////////////////////////////////////////////////////
//STRUCTURES

```
100     DATA_STRUCTURE TsavedWindow
{

102     //CUBE STATE
104     FLOAT   modelToWindowScale;

106.    MATRIX  modelToWindowRotation;
108     MATRIX  modelToWidowTwist;
110     VECTOR  modelToWindowTranslation;

112     VECTOR  cubeCentroid;
114     VECTOR  pivotPoint;

116     INTEGER numExtraFaces;
118     PLANE   extraFaces [20];

120     // RENDER PARAMETERS
122     INTEGER renderMode;
124     FLOAT   renderParameters [5];
126     INTEGER brightness;
128     INTEGER contrast;

130     // OVERLAYS
132     INTEGER selectedFace;
134     BOOLEAN renderOverlay;
136     BOOLEAN renderImage;
138     BOOLEAN doubleBuffer;

140     INTEGER biLightFaceID;
142     INTEGER frontFaceID;

144     INTEGER numOverlayPoints;
146     VECTOR  overlayPoints[20];
```

FIG. 6

148    DATA_STRUCTERED TsavedView
{
150    TsavedWindow m_savedWidows [4];
};

152    DATA_STRUCTURE TsavedSequence
{

154    INTEGER numSavedWindows;      // number of saved views
156    TsavedView m_savedViews [N];            // N is equal to numSavedViews
}

158    A TsavedSequence is a sequence of N TsavedView data-structures

FIG. 7

```
200    captureScreen (DCOM_IMAGE originalCINE_File)
{
       ////////////////////////////////////////////////////////////////////////
       // capture the screen, and convert to DICOM single-frame object.
       // this screenshot is a derived image; the original CINE file is the primary image
       ////////////////////////////////////////////////////////////////////////

202            DICOM-IMAGE screenshot = storeScreen (originalCINE_File);

////////////////////////////////////////////////////////////////////////
204    // store coordinates ////////////////////////////////////////////////////////////////////////
206    // a) fill a TsavedView data structure
       ////////////////////////////////////////////////////////////////////////

210    for (INTEGER windowID = 0; windowID < 4; ++windowID)
       {
212            // fill a TsavedWindow data structure
214            mySavedView.m_savedWindow [windowID] = fillSavedWindow (windowID);

}

////////////////////////////////////////////////////////////////////////
216    // b) add the TsavedView data structure into the DICOM single-frame object
       ////////////////////////////////////////////////////////////////////////
218            addSavedView (screenShot, mySavedView);

```
220    replayScreen (DICOM-IMAGE screenshot)
{
       ////////////////////////////////////////////////////////////////////////
222            // get primary CINE file
224            DICOM-IMAGE originalCINE = getOriginal (screenshot);

////////////////////////////////////////////////////////////////////////
226            // extract saved view from screenshot
228            TsavedView mySavedView = getSavedView (screenshot);

////////////////////////////////////////////////////////////////////////
230            // load primary CINE file in 3D mode, along with configuration information 232            load3D (originalCINE, mySavedView);

```
234    captureSequence (DICOM-IMAGE originalCINEdr)
       {

//////////////////////////////////////////////////////////////////////
236           // capture the screen
238           DICOM-IMAGE screenshot = storeScreen (originalCINE);

///////////////////////////////////
240           // 1. Fill TsavedSequence

242           INTEGER savedViewBegin;
244           INTEGER savedViewEnd;
246           INTEGER numViews = savedViewEnd - savedViewBegin + 1;

248           TsavedSequence mySavedSequence (numViews);

250           // loop through all saved views in sequence
              for (INTEGER savedViewID = savedViewBegin; savedViewID < savedViewEnd,
                                                                         ++savedViewID)
              {

252                  // loop through all saved windows in saved view
                     for (INTEGER windowID = 0; windowID < 4; ++windowID)
                     {
                            // store saved window
254                         mySavedSequence.m_savedViews [savedViewID].m_savedWindows [windowID] =
                                                               fillSavedWindow (savedViewID, windowID);
                     }
              }

/////////////////////////////////////////////////
              // 2. Add savedSequence to screenshot file
256           addSequence (screenshot, mysavedSequence);

```
258   replaySequence (DICOM-IMAGE screenshot)
{
            //////////////////////////////////////////////////////////////
            // 1. Get primary CINE file
260         DICOM-IMAGE originalCINE = getOriginal (screenshot);

//////////////////////////////////////////////////////////////
            // 2. Extract TsavedSequence from screenshot
262         TsavedSequence mySavedSequence = getSavedSequence (screenshot);

// 3. Load primary CINE file in 3D mode. Along with configuration information
264         load3D (originalCINE, mySavedSequence);

// 4. Play the sequence
266         BOOLEAN playSequence = TRUE;
268         INTEGER numViews = mySavedSequence. numSavedViews 270         INTEGER sequencePosition = 0;
            // sequencePosition indicates current position in sequence.
            // sequencePosition = (0, 1, 2,......numViews-1, 0, 1, 2,.............)

// loop continously through TsavedSequence
272         while (playSequence == TRUE)
            {

// display view corresponding to the TsavedView at position sequencePosition
274         displaySavedView (sequencePosition);

// increment sequencePosition
276         sequencePosition = sequencePosition + 1;

// rest if at end
278         if (sequencePosition == numViews)
            {
280              sequencePosition = 0;
            }
            }
}
```

FIG. 11

METHOD AND SYSTEM FOR STORING INFORMATION REGARDING A SELECTED VIEW OF A THREE DIMENSIONAL IMAGE GENERATED FROM A MULTI-FRAME OBJECT

FIELD OF THE INVENTION

The present invention relates generally to computer-generated images, and more particularly, to a method, system and software product for storing information regarding a selected view in a series of views of a three-dimensional image.

BACKGROUND OF THE INVENTION

Computer-generated images are used in many different industries to model surfaces and solids. In the medical fields, computer imaging is used in combination with ultrasound scanning, magnetic resonance scanning or other medical scanning technology to display, analyze and organize the data these medical scanning technologies provide. For example, ultrasound machines use ultrasonic wave, i.e. sonar, to scan a patient's body. The data thus obtained is then analyzed by physicians to assist the physicians in their diagnosis and treatment of patients. Ultrasound can be used to view a fetus, blood-flow patterns in arteries, or to scan organs for irregularities such as cysts.

Digital Imaging and Communication in Medicine (DICOM) is a detailed specification describing a means of formatting and exchanging images and associated information. In a DICOM image file, the actual image data as well as information about the image, such as image width and height is stored. DICOM images can be either single-frame objects (a single frame of data) or multi-frame objects (multiple frames of data). A CINE file is a multi-frame object that can be viewed as a 3-dimensional cube (parallelopiped) of data. A user can generate various 3-dimensional views of the CINE file by interacting with this cube of data. The DICOM 3D module loads a CINE file and allows the user to create various 3-dimensional views of the CINE data.

Typically, a three dimensional image is displayed to a user by being projected on a two dimensional surface such as a screen or monitor. On the screen or monitor, the three dimensional image is typically viewed by a user through a series of two dimensional views.

New views can be generated of a CINE file by geometrically manipulating the original cube of data and by generating new-cut planes that intersect with the original cube. Not all views are equal in terms of displaying relevant information regarding the patient, so one reviewing the image data will typically search for views that show the most information. For example, a scanned portion of a patient may include an area of particular interest, such as, for example, a tumor, which is not visible in many views of the scanned portion of the patient. Of the views in which the tumor is visible, there will be an optimal view that shows more information regarding the tumor than other views.

In DICOM, a "study" is a series of images associated with a particular patient. Each study has an associated "Study UID", (unique identifier), which is a unique identifier of that study. Each image in a given study has an "image UID", which uniquely identifies the image in a given study.

Given a particular DICOM image, a derived image can be generated from it by geometrically manipulating a coordinate space (parallelopiped) on which the image data is mapped as described above. The derived image will contain information describing the Study and Image UID of the primary image from which it was derived.

Say that a patient is scanned by a technician using an ultrasound scanner. Image data obtained from the patient at a scanning station will be saved as a CINE file having a Study and Image UID that identifies the patient. The technician may subsequently review the data, and generate one or more derived images from the initial images or frames of the CINE file. The CINE file will then be sent to the review station, where it will be reviewed again, and more derived images generated. The CINE file may then be sent on to other review stations. However, each user at each review station must start anew in analyzing the CINE file.

As a result of this failure to transmit derived images, or other information regarding the CINE file with the CINE file, work and analysis is lost, resulting in the same analysis having to be conducted more than once. Accordingly, there is a need for a system, method and computer software product for recording a reviewer's selections and, in particular, the derived images, made from a CINE file such that subsequent users reviewing the CINE file, can also have access to previous reviewers selections from the CINE file.

BRIEF SUMMARY OF THE INVENTION

An object of one aspect of the present invention is to provide a method executable on a computer system V for storing information regarding a selected view of a 3-dimensional image.

In accordance with one aspect of the present invention, there is provided a method of storing and restoring for replay a selected view from a series of views of a three dimensional image generated from an image object. The three dimensional image is generated in an image coordinate set of a coordinate space. Each image coordinate in the image coordinate set has an associated image property in the image object. The three dimensional image is configurable to sequentially make each view in the series of views viewable, and has an associated configuration for each view in the series of views. The method comprises (a) selecting the selected view from the series of views; (b) storing an object unique identifier for the image object; (c) storing the associated configuration for the selected view of the three dimensional image; (d) retrieving the object unique identifier; (e) retrieving the image object using the object unique identifier; (f) retrieving the associated configuration for the selected view of the three dimensional image; (g) generating the three dimensional image in the coordinate space from the image object; and, (h) configuring the three dimensional image to have the associated configuration for the selected view to make the selected view viewable.

An object of a second aspect of the present invention is to provide a view-storing data structure for storing information regarding a selected view of a 3-dimensional image.

In accordance with this second aspect of the present invention, there is provided a view-storing data structure for storing a selected view from a series of view of a three dimensional image generated from an image object having a unique identifier. The three dimensional image is generated in an image coordinate set of a coordinate space. Each image coordinate in the image coordinate set has an associated image property in the image object. The three dimensional image is configurable to sequentially make each view in the series of views viewable, and has an associated configuration for each view in the series of views. The data structure comprises an image identification object for storing the unique identifier of the image object, and a view object for storing the associated configuration of the selected view in the three dimensional image.

An object of a third aspect of the present invention is to provide a computer system for storing information regarding a selected view of a 3-dimensional image.

In accordance with this third aspect of the present invention, there is provided a data processing system for storing and restoring for replay a selected view from a series of views of a three dimensional image generated from an image object. The three dimensional image is generated in an image coordinate set of a coordinate space. Each image coordinate in the image coordinate set has an associated image property in the image object. The three dimensional image is configurable to sequentially make each view in the series of views viewable, and has an associated configuration for each view in the series of views. The data processing system comprises means for performing the steps of (a) selecting the selected view from the series of views; (b) storing an object unique identifier for the image object; (c) storing the associated configuration for the selected view of the three dimensional image; (d) retrieving the object unique identifier; (e) retrieving the image object using the object unique identifier; (f) retrieving the associated configuration for the selected view of the three dimensional image; (g) generating the three dimensional image in the coordinate space from the image object; and, (h) configuring the three dimensional image to have the associated configuration for the selected view to make the selected view viewable.

An object of a fourth aspect of the present invention is to provide a computer program product for storing information regarding a selected view of a 3-dimensional image.

In accordance with this fourth aspect of the present invention, there is provided a computer program product for use on a computer system to store and restore for replay a selected view from a series of views of a three dimensional image generated from an image object. The three dimensional image is generated in an image coordinate set of a coordinate space. Each image coordinate in the image coordinate set has an associated image property in the image object. The three dimensional image is configurable to sequentially make each view in the series of views viewable, and has an associated configuration for each view in the series of views. The computer program product comprises a recording medium and means recorded on the medium for instructing the computer system to perform the steps of (a) selecting the selected view from the series of views; (b) storing an object unique identifier for the image object; (c) storing the associated configuration for the selected view of the three dimensional image; (d) retrieving the object unique identifier; (e) retrieving the image object using the object unique identifier; (f) retrieving the associated configuration for the selected view of the three dimensional image; (g) generating the three dimensional image in the coordinate space from the image object; and, (h) configuring the three dimensional image to have the associated configuration for the selected view to make the selected view viewable.

BRIEF DESCRIPTION OF THE DRAWINGS

Reference will now be made, by way of example, to the accompanying drawings, which show preferred aspects of the present invention, and in which:

FIG. 4 is a pseudo code listing of the logic steps to be executed in an optimal view selection method;

FIG. 5 sets out in pseudo code steps for generating an optimal plane when points on the optimal plane have been selected;

FIGS. 6 and 7, are pseudo code listings for data structures in accordance with a preferred embodiment of the invention;

FIG. 8, is a pseudo code listing of a method of capturing a screen in accordance with a preferred aspect of the invention;

FIG. 9, is a pseudo listing of a method of replaying the captured screen of FIG. 8 in accordance with a preferred aspect of the invention;

FIG. 10, is a pseudo code listing of a method of capturing a sequence of selected views in accordance with a preferred aspect of the invention; and, FIG. 11, is a pseudo code listing of the steps in a method of replaying a captured sequence in accordance with a preferred aspect of the invention.

DETAILED DESCRIPTION OF THE PREFERRED EMBODIMENTS OF THE INVENTION

Figure 1:
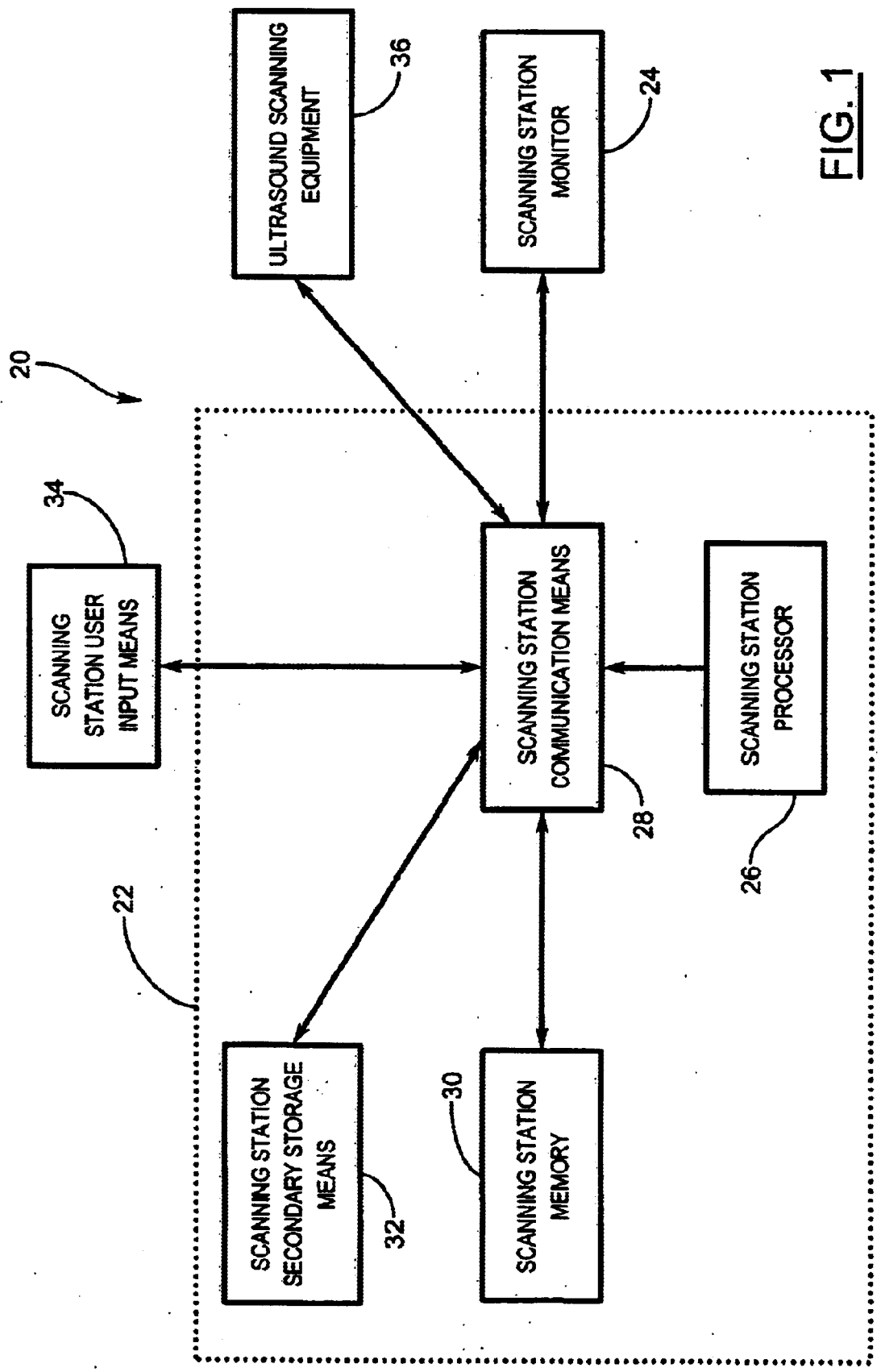
FIG. 1, in a block diagram, illustrates a scanning station including a computer system that may be configured to implement an embodiment of the invention.

Referring to FIG. 1, there is illustrated a block diagram of a scanning station 20 including a computer system 22 for analyzing computer-generated 3-dimensional images in accordance with the preferred embodiment of the invention. As shown in FIG. 1, the computer 22 is connected to a monitor 24 having a 640×480 screen, a user input means 34 such as a manually operated mouse 34 and ultrasound scanning equipment 36 that scans the patient to obtain a study of the patient.

The computer system 22 includes a communication means 28, and a processor 26 that is connected to the communication means 28. The computer system 22 further comprises a memory 30 for storing data records and instructions regarding the manipulation of such data records. The memory 30 is connected to the processor 26 via the communication means 28, as is the user input means 34 and the monitor 24. In a preferred embodiment, the present invention relates to the use of the computer system 22 to store information regarding a selected view in a series of views of a three dimensional image generated from a CINE file.

When scanning a patient, an ultrasound operator passes a probe over a portion of the patient's body. The probe emits and receives a series of ultrasonic waves. Based on the difference between the ultrasonic waves that are emitted and those that are received, a frame of data representing a cross-sectional view of the patient's body is obtained along the path of the probe. The probes generates, say, 150 frames of data in a typical pass over the scanned portion of the patient's body. Each frame of data represents a cross-section of the part of the patient's body that is scanned using ultrasonic waves. Each frame is typically 640 by 480 pixels, but only the region of interest, which is typically about 250 by 250 pixels, is stored. Accordingly, the image data in the CINE FILE would consist of about 150 frames, each frame being about 250 by 250 pixels.

Once the image data has been received from the ultrasound scanning equipment 36, it is loaded from a CINE file or multi-frame object in 3-D mode. This CINE file can then be reviewed at the ultrasound station, or alternatively at review stations in which it is transmitted to from the ultrasound station.

Figure 2:
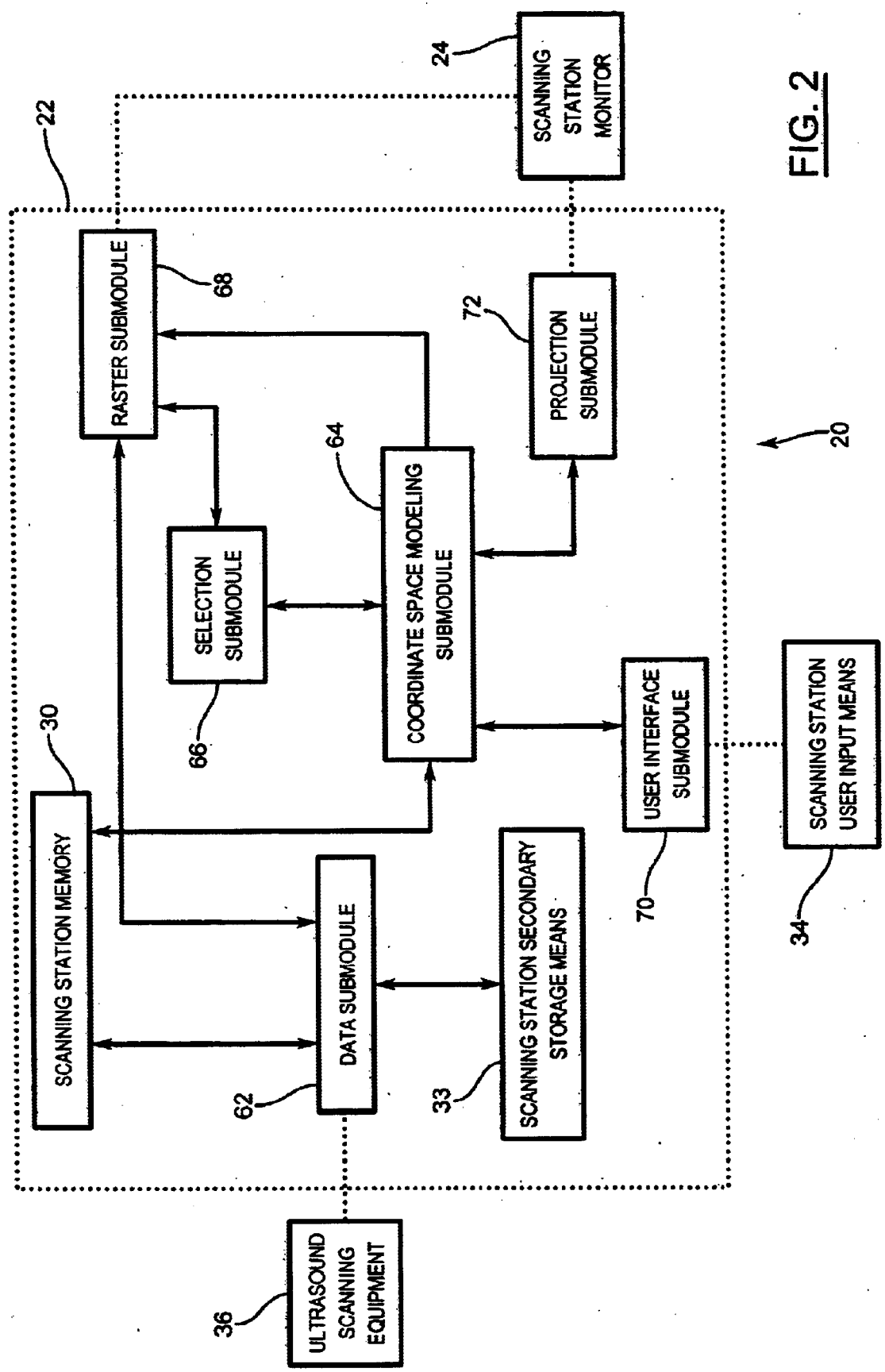
FIG. 2, in a block diagram, illustrates the scanning station and computer system of FIG. 1 as configured by imaging software.
Figure 3:
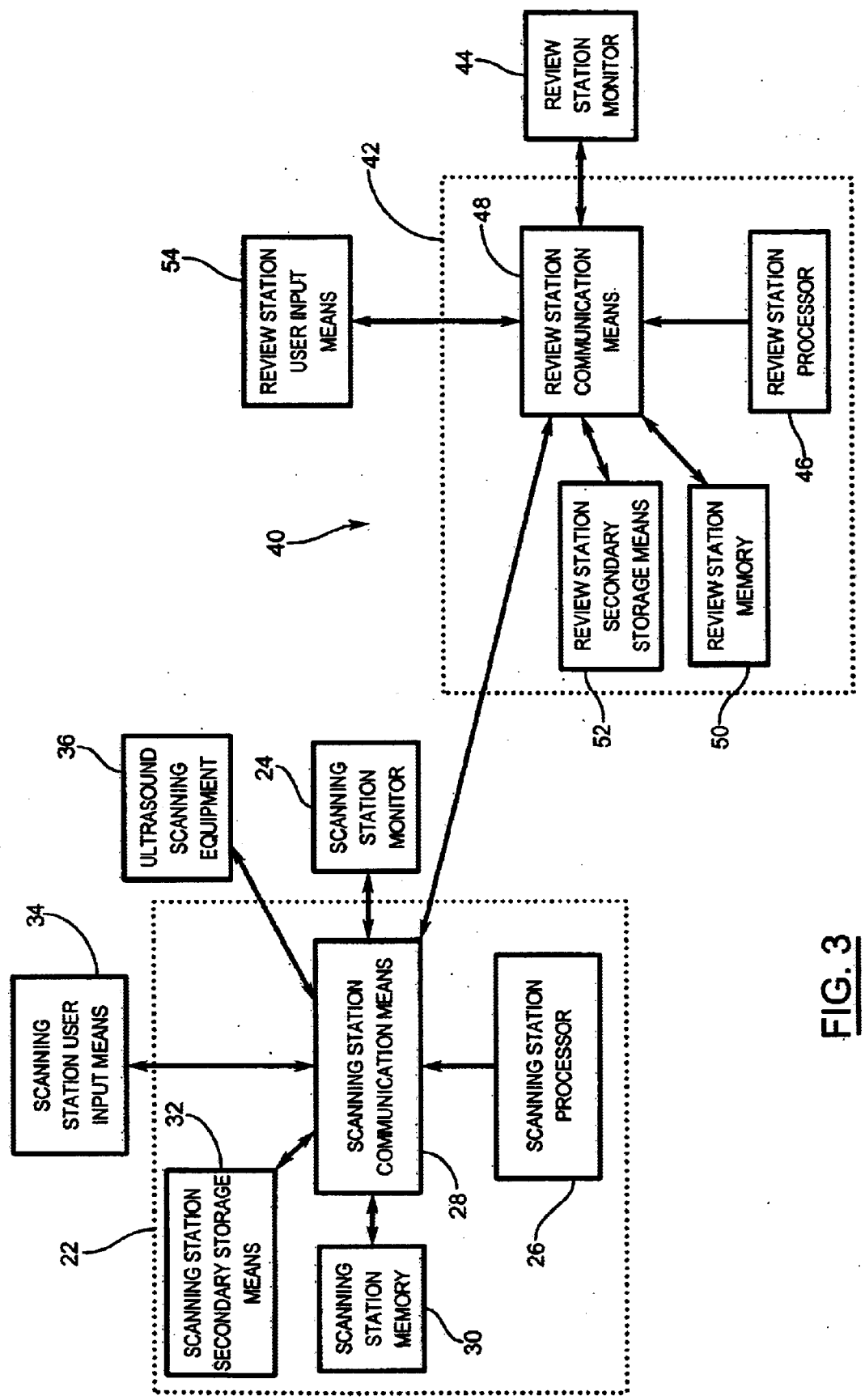
FIG. 3, in a block diagram, illustrates the scanning station of FIG. 1 electronically connected to a review station including a computer system that may be configured to implement an embodiment of the invention.

FIGS. 2 and 3 relate to subject matter that is described and claimed in more detail in U.S. patent application Ser. No. 09/266,891, which is hereby incorporated by reference. FIG. 2 illustrates the computer system 22 as configured by imaging software. The ultrasound scanning equipment 36 communicates with the computer 22 and provides image data to a data submodule 62 of the imaging software on the computer 22. The data submodule 62 orders the image data in an image data array, such that each ordered image property in the image data array has associated spatial coordinates. The x and y spatial coordinates are determined by the location of the data within the 250 by 250 frame, while the z spatial coordinate can be assigned to the data by the data submodule 62 based on the frame in which the data is found.

In order to form three dimensional images based on the image data received from the ultrasound scanning equipment 36, the computer 22 includes a conventional coordinate space modeling submodule 64 for generating a coordinate space. Preferably, the coordinate space takes the form of a right-angled parallelepiped, which will be referred to as modelpoly (where "poly" is an abbreviation of "polyhedron"). The modelPoly is defined around the origin of a left-handed xyz coordinate system.

The coordinate space modeling submodule 64 handles all of the geometry involved in manipulating modelPoly in order to select perspectives from which to view modelpoly. These geometric transformations are more easily performed when modelPoly remains located about the origin. Accordingly, modelPoly is geometrically transformed to form a winPoly, and it is winPoly that is projected on the screen of the monitor 24 that the user sees, while modelpoly remains located about the origin.

The coordinate space modeling submodule 64 handles all of the geometry involved in rotating, translating and scaling modelPoly. The calculations involved in geometrically transforming the coordinate space are more easily performed when modelpoly remains located about the origin. Accordingly, all of the geometry involved in rotating, translating and scaling modelpoly is recorded in a rotation matrix R, a translation matrix T and a scaling matrix S, while modelPoly itself remains located about the origin. ModelPoly is rotated, translated and scaled by the matrices R, T and S to form a winPoly. It is winpoly as projected on the screen of the monitor 24 that the user sees. Initially, the matrices R, T, and S do not specify any rotation, translation or scaling of winpoly as compared to modelPoly. Then the user incrementally adds information to each of R, T and S by performing sequences of geometrical transformations on winPoly. Say, for example, that the user rotates winpoly, thereby changing the visible face of winPoly (by convention, visible faces are defined as having a surface-normal with z-component less than zero). This rotation information is recorded in $R_1$ by multiplying $R_n$ by a matrix representing the rotation of winPoly ($R_1$ in this case—$R_n$ is the rotation matrix after n distinct rotations have been applied to modelpoly) Subsequently, winPoly is rotated again; this information is recorded in $R_2$ by multiplying $R_1$ by a matrix representing this second rotation of winpoly (the matrix generated by $R_1^{-1}*R_2$ in this case).

Some operations such as slicing and pivoting are recorded on modelPoly itself and not in the matrices that transform modelpoly to winPoly. These operations determine the clip state of modelpoly; that is, these operations determine all of current surfaces of modelpoly. Initially, this clip state includes the six faces and eight vertices of the parallelepiped. A new surface can then be added by slicing in from one of the original six planes along the normal of such original face to generate a new surface parallel to such original face. Then this first-added surface can be discarded by cutting in from the first-added surface, or by pivoting about an arbitrary axis on the first-added surface to generate a second-added surface. After this second operation, the clip state would include the six initial faces and the second-added surface, but not the first-added surface, which has been discarded.

The two dimensional views of winpoly shown on the screen of the monitor 24 can be rendered using a number of different approaches. In the case of three dimensional texture mapping, a surface of winpoly can be generated by slicing through winpoly at a defined location and orientation to provide the desired cross-sectional view. A selected surface can also be viewed by displaying the intersection of a series of parallel rays at a specified orientation with a predefined surface that can be defined by means of an equation. Alternatively, maximum intensity projection (MIP) can be used to render a two dimensional view of winpoly by taking the intersection of a series of parallel rays of a selected orientation with the pixel of maximum intensity that lies in the path of such ray. Other well known rendering techniques include opacity rendering and surface rendering.

After modelpoly is rotated, translated and scaled by the matrices R, T and S to form winpoly, the coordinates of the visible faces of winPoly are projected to a two-dimensional image with lines connecting adjacent coordinates. The two-dimensional projection of winpoly is then sent to a raster submodule 68 (FIG. 1). The raster submodule 68 maps image data onto the two dimensional image of each visible face of winPoly, by, for each ordered image property of the image data array that has associated coordinates on a visible surface, mapping such ordered image property onto such associated coordinates. First, the projected face is broken up into contiguous, 2-dimensional triangles. Next, each triangle is filled by first identifying the minimum y value and the maximum y value that lie in the triangle. Then, for these two points, and for each y value falling between these two points, a line segment is determined. One end of this line segment is a point having the smallest x integer value falling inside the triangle, while the other end is a point having the largest x integer value falling inside the triangle. The ordered image properties having associated spatial coordinates corresponding to this line segment are then mapped onto the line segment by the raster submodule 68.

The projected two dimensional image of winpoly is projected onto the screen of the monitor where it can be seen by the user. Using the user input means 34, the user can send commands to a user interface submodule 70, where these commands are interpreted and transmitted to the coordinate space modeling submodule 64. Examples of possible commands include the command to rotate, translate or scale winpoly. All of these commands, will result in a new view being displayed on the screen of the monitor 24.

When reviewing image data, a user interacts with winPoly as displayed on the monitor 24, by translating, rotating and scaling winPoly, and by slicing or pivoting surfaces of modelPoly, which sliced and pivoted surfaces are automatically mapped onto winpoly. When the user finds a point of interest in a particular viewed surface, the user presses an "Optimal Surface" button and using the user input means 34 selects the point of interest, thereby specifying the display coordinates of the point of interest on the monitor 24. This sends a message to a selection submodule 66 via user input means 34 and user interface submodule 70 that a point of interest is at the display coordinates specified. The selection submodule 66 then determines the spatial coordinates on the visible surface of winpoly that correspond to the display coordinates of the point of interest on the monitor 24 as well as the corresponding modelPoly spatial coordinates, which are determined using the matrices R, T and S. These spatial coordinates of interest are then stored in memory 26. The user can then continue to interact with winPoly and to select new points of interest.

After two or more points of interest have been selected, and their corresponding modelPoly spatial coordinates have been stored, the user can elect to generate an optimal surface including at least two spatial coordinates of interest. If only two points are selected, then an optimal plane can be generated including both these points. The optimal plane is definable by either one of the two selected points, and by two vectors, one of which is the vector obtained by subtracting modelpoly spatial coordinates corresponding to one of the selected points from modelpoly spatial coordinates corresponding to the other of the selected points. The second vector used to define the plane can then be selected arbitrarily, provided, of course, that the second vector is not parallel to the first vector. For simplicity, the optimal view submodule sets the second vector equal to (0,Y,0), Y>0. The normal to the optimal plane thus generated is calculated by taking the cross product of the two vectors. This normal will lie in the xz plane.

If three or more points of interest have been selected and their corresponding modelPoly spatial coordinates have been stored, the user can elect to generate an optimal surface including at least three spatial coordinates of interest. If only three points are selected, then an optimal plane is generated including these three points. The optimal plane is definable by any one of the three modelPoly spatial coordinates corresponding to the three selected points, and by two vectors. These two vectors are defined by the three modelpoly spatial coordinates corresponding to the selected three points. Specifically, a first vector is determined by subtracting a first one of the three modelpoly spatial coordinates from a second one of the three modelPoly spatial coordinates, while a second vector is determined by subtracting the first one of the three modelPoly spatial coordinates from a third one of the three modelPoly spatial coordinates. The normal of the plane defined by these two vectors and any one of modelPoly spatial coordinates corresponding to the three selected points is determined by taking the cross-product of these two vectors. FIG. 4 sets out in pseudo code the above-described steps for generating an optimal plane.

Once an optimal viewing plane has been defined, such plane is displayed on the monitor 24 by first rotating winpoly such that the optimal viewing plane will be visible when exposed (assuming that the above-stated convention holds—that visible faces are defined as having a surface-normal with z-component less than zero—then the rotation should result in the vector defining the normal of the optimal viewing plane having a negative z component; preferably, the z component should also be large relative to the x and y components of the vector). Then a visible surface is sliced and pivoted as required to obtain the optimal viewing plane. The selection submodule 66 is integrated into the coordinate space modeling submodule 64 and automatically performs these transformations to generate the optimal viewing plane as a visible face.

In FIG. 4, a pseudo code listing shows the steps of a method of selecting at least one optimal view of a three dimensional image. The method is preferably implemented using the above-described three dimensional imaging system.

The first step of the method, after starting, is to initialize all of the data structures employed as indicated in line 2. The modelpoly, generated in model coordinates, is transformed by the rotation matrix R, the scaling matrix S and the translation matrix T to generate winpoly in window coordinates. All of these matrices are initialized so as to not rotate, scale or translate modelpoly when generating winPoly (i.e. S specifies 1:1 mapping such that there is no scaling). The ordered image properties of the image-defining array is mappable onto winpoly to generate projected visible surfaces of winpoly on the monitor 24 (although winPoly has not yet been generated). When viewing these projected visible surfaces of modelPoly, a user may decide to select a point of interest; the coordinate corresponding to this point of interest is then added to the set of interesting coordinates. Initially, however, the set of interesting coordinates is empty.

ModelPoly has a clip state consisting of the six initial faces and the eight initial vertices of modelPoly's initially parallelepiped form; these six initial faces always remain in the clip state. New surfaces are added to the clip state when parts of modelPoly are cut away to expose these new surfaces; formerly new surfaces may be removed from the clip state at this point if such former new surfaces are part of the portion of modelpoly that must be cut away to expose the new surface.

Next, in line 3, the R, S and T matrices multiply each modelPoly coordinate to generate winPoly coordinates. Initially, there is no rotating, scaling or translation of modelPoly to generate winPoly. However, each time one or more of R, S and T are changed in subsequent steps, each coordinate in modelPoly is multiplied by the relevant matrix to change winpoly. These transformation techniques are well known to those skilled in the art. After step 3 has been executed, the next step, line 4, is to project winPoly onto the x-y coordinates. This projection must be a one-to-one projection. After projecting winPoly onto the x-y coordinates, the raster and data submodules fill all the visible surfaces by mapping the ordered image property specified by the image-defining array for each coordinate on the visible surface; "visible surfaces" are surfaces of winpoly that have been projected onto the x-y coordinates.

After winpoly has been projected on the x-y coordinates, this projection is displayed on a screen. Then the user can choose from a number of options, including an exit option, by suitably manipulating the mouse. The user can rotate winpoly, which is mathematically represented by multiplying the current matrix $R_n$ ($R_n$ is the rotation matrix after n rotation operations) by a rotation transformation matrix $R_t$, to yield $R_{n+1}$. $R_{n+1}$ is then applied to each coordinate of modelPoly to yield each new coordinate of winPoly after the rotation represented by $R_t$. This sequence of steps is represented in FIG. 4 by the following loop: step 5 to step 6 to step 3 to step 4 to step 5. Analogous loops are defined by the pseudo code of FIG. 4 for scaling (step 5 to step 7 to step 3 to step 4 to step 5) and for translation (step 5 to step 8 to step 3 to step 4 to step 5).

The slicing and pivoting options of step 5 are different from the rotation, scaling and translation options of step 5 in that these modify modelpoly itself and its clip state, instead of merely modifying the matrices R, S and T used to generate winPoly from modelPoly. Before any slicing or cutting is performed, it will be one to three of the initial six faces of winPoly that are projected to the x-y plane, rasterized (image data is mapped to the visible surfaces by the raster submodule) and displayed. These original faces are then pivoted or sliced by cutting away part of the modelpoly to expose a new surface. If a new surface is modified by slicing or pivoting, then that formerly new surface is deleted from the clip state and the current new surface is added. If, however, one of the initial 6 surfaces is cut away by slicing or pivoting, then such initial surface remains in the clip state. After slicing or pivoting, the clip state and modelpoly are suitably modified, as set out in step 14, and then the matrices R, S and T transform the modelPoly to yield a winpoly with new surfaces exposed. This new winpoly is then projected, one-to-one, onto the x-y plane, and is displayed on a screen. The slicing loop shown in FIG. 5 is step 5 to step 9 to step 13 to step 3 to step 4 to step 5 and the pivoting loop is step 5 to step 10 to step 13 to step 3 to step 4 to step 5.

If the user opts to select a point of interest, then the user locates the cursor as close to such point as possible and clicks an "Optimal Surface" button. The screen coordinate, (x-y coordinate) closest to such point is then determined. As there is a one-to-one correspondence between such x-y coordinate and the winPoly coordinates, the corresponding winPoly coordinates can be located. Then by multiplying such coordinates by the product of $R^{-1}$, $S^{-1}$ and $T^{-1}$, the corresponding modelPoly coordinates can be determined. These modelPoly coordinates are then designated coordinates of interest and are stored in memory. If there is only one coordinate of interest, then the user returns to step 5; thus, the loop in that case is step 5 to step 11 to step 5.

If two or more coordinates of interest have been determined, then the user may elect at that time to generate an optimal plane. Assuming the user so elects, the rotation matrix R is modified so as to point the normal of the optimal plane in winpoly in a direction substantially parallel to the z axis, and having a positive sense. Then the surfaces of modelPoly are sliced and pivoted, and the clip state changed, as required, to expose the optimal surface. The loop specified by FIG. 4 is as follows: step 5 to step 11 to step 12 to step 13 to step 14 to step 5. Step 13 automatically goes to step 5 and executes the rotating, slicing and pivoting loops as required to render the optimal plane visible. FIG. 5 sets out pseudo code for calculating an optimal plane.

Alternatively, coordinates may be selected from views that are not views of surfaces. For example, the raster submodule 68 may perform a rendering mapping that shows the interior of winPoly. One example of a volume rendering mapping is to show winPoly as a series of rays parallel to the z coordinate axis. Then, of all of the ordered image properties having associated coordinates on one such ray, only the ordered image property of highest intensity is mapped to such ray. Thus, the resulting image shows coordinates at varying depths, and indicates these depths by the distance of such coordinates along its ray. This technique is called Maximum Intensity Projection According to a preferred embodiment of the invention, when a user reviewing the data selects either a single view of, or point in, the 3 dimensional image, or a sequence of views of, or points in, a 3 dimensional image, the associated configuration of originalCine for that view is saved in a data structure. Generally, if a CINE file is being visualized on a computer screen, then this can be considered a derived image of the primary CINE file. It can be stored as a single-frame object derived from the multi-frame CINE file. However, the single-frame derived image as it has been described above is a static view of the CINE file. It cannot be further manipulated by another user. According to the present invention, where an associated configuration of originalCine is saved, originalCINE can be reconfigured to the associated configuration it had when the view was selected, thereby enabling the data to be further manipulated from this point.

Referring to FIGS. 6 and 7, pseudo code is listed describing the structure of three data structures in accordance with the preferred embodiment of the invention. The three data structures are TsavedWindow (line 100), TsavedView (148) and TsavedSequence (152). These terms are described in pseudo code lines 100 to 158. In these pseudo code lines, the following TYPE terms are used: FLOAT, INTEGER, MATRIX, VECTOR, PLANE, FACE AND DICOM_IMAGE. A FLOAT is a floating point number—i.e. a decimal number. An INTEGER is an integer. A MATRIX is a 4x4 transformation matrix. A VECTOR is a floating point vector in three dimensions—in other words, a triple of floating numbers. A PLANE is a plane satisfying the equation $Ax+By+Cz+D=0$. A FACE is a set of n points on a given plane, where n is greater than or equal to 3. A DICOM_IMAGE is a DICOM image.

The data-structure TsavedWindow 100 relates to an individual window in a view. The 3 dimensional visualization of data typically takes place in a windowed environment; the entire screen is divided into a number of windows, each window providing a different view of the data set. Given a set of these windows at a particular point in the interaction process, a saved view data structure will store the configuration information from each window that is needed to reconstruct that particular view of the data.

According to a preferred embodiment of the invention, each view includes four windows—viz. four different surfaces of winPoly will be shown on the screen of a monitor at a time. One of the windows shows winpoly—in other words, this window shows a three dimensional image. Of the three remaining windows, one shows the active face of winpoly—i.e. it shows the face that is being cut or pivoted about a point. The remaining two windows show two, mutually orthogonal, two-dimensional views of planes that are orthogonal to the active face. The data objects that are included in the data-structure TsavedWindow (line 100) fall into three categories indicated by the following headings: CUBE STATE (line 102); RENDER PARAMETERS (line 120); and OVERLAYS (line 130). The CUBE STATE data objects store information regarding the geometry of winpoly, the RENDER PARAMETERS data objects store information regarding how winPoly is rendered, and the OVERLAYS data objects store information regarding the overlay information for winPoly There are eight CUBE STATE data objects listed from line 102 to 114. ModelToWindowScale at line 104 is a data object of type FLOAT, and stores and controls the scaling of winPoly. ModelToWindowRotation at line 106 is a data object of type MATRIX, and stores information regarding the rotation of the winpoly in a 4x4 transformation matrix—a corresponding matrix is designated by "R" elsewhere in the specification (the R matrix differs from the modelToWindowRotation matrix as R is used to transform modelpoly to yield winPoly as shown, while ModelToWindowRotation is used to store a specific configuration of R and winPoly that renders an optimal view viewable. ModelToWindowTwist at line 108 is a data object of type MATRIX, and similarly stores rotation information; however, this rotation information is stored regarding each of the 2 dimensional windows, and does not regard winpoly as displayed in the first window.

ModelToWindowTranslation at line 110 is a data object of type VECTOR and stores linear displacement of winpoly relative to the origin. CubeCentroid at line 112 is a data object of type VECTOR and stores the spatial coordinates for the center of winPoly, while pivotPoint at line 114 is a data object of type VECTOR and stores the spatial coordinates for a point that has been selected by a user.

NumExtraFaces is a data object of type INTEGER, that stores the number of faces that have been generated (see the foregoing description regarding the clip state of modelpoly)—numExtraFaces does not count the initial 6 faces as these are not "extra" faces. ExtraFaces at line 118 is a data object of type PLANE that stores the coordinates of up to 20 extra faces.

There are four RENDER data objects listed from lines 122 to 128. RenderMode at line 122 is a data object of type INTEGER that stores rendering information. Different integers are used to stand for each rendering mode. For example, 1 might represent maximum intensity projection, while 0 represents no rendering, and 3 represents opacity rendering. RenderParameters [5] at line 124 is a data object of type FLOAT that defines parameters relative to the render mode. For example, if maximum intensity projection is the render mode selected or indicated by integer stored in the renderMode data object at line 122, then renderParameters would store the minimum threshold for the maximum intensity projection, such that image properties having an intensity below this minimum threshold are ignored. Brightness at line 126, is a data object of type INTEGER, that stores information regarding the brightness of the image displayed. Different integers are used to stand for different levels of brightness according to a predefined code. Contrast, at line 128, is a data object of type INTEGER, that stores information regarding the contrast of the image displayed. Different integers are used to stand for different levels of contrast according to a predefined code.

There are four OVERLAY data objects listed from line 132 to 146. The four OVERLAY data objects do not relate directly to the image data, but rather to structure that is superimposed on this image data, such as, for example, a wire frame that surrounds the three dimensional view of winPoly shown on the monitor. SelectedFace, at line 132, is a data object of type INTEGER that stores an integer used to identify the face that has been selected. RenderOverlay at line 134, is a data object of type BOOLEAN that turns the superimposed overlay structures off and on. For example, renderOverlay turns the overlay off when winPoly is being transformed by, say, rotating winPoly. RenderImage at line 136 is a data object of type BOOLEAN that indicates whether the image should be rendered at a particular time (during some transformations, the image may not be rendered). DoubleBuffer at line 138 is a data object of type BOOLEAN indicating whether a double buffer is required. A double buffer may be required to store the rendered image without the superimposed overlays, whilst the rendered image with the superimposed overlays is projected to the screen. Then, subsequent transformations can be performed, and the image data stored without the superimposed overlays can be selectively re-rendered as required by changes in the geometry of winPoly. If the rendered image data was only stored with the overlays, then it would be necessary to re-render the entire image as otherwise the old overlays would corrupt the new rendered image. HiLightFaceID, at line 140, is a data object of type INTEGER that stores an integer identifying the active face. FrontFaceID, at line 142, is a data object of type INTEGER that stores an integer identifying the start face. NumOverlayPoints at line 144 is a data, object of type INTEGER that stores the number of overlay points selected by the user. OverlayPoints[20] at line 146 is a data object of type VECTOR that stores the coordinate points for up to 20 overlay points selected.

As indicated at line 148 of the pseudo code of FIG. 6, four TsavedWindow data structures are included in the data structure TsavedView, reflecting the feature of the preferred embodiment of the invention that each view includes four windows.

Of course, it is likely that more than a single view of interest will be generated and will, accordingly, sometimes need to be saved. As indicated at lines 152 to 156 of the pseudo code of FIG. 6, the data structure TsavedSequence stores a sequence of views. TsavedSequence includes a data object and a data structure. NumSavedViews at line 154 is a data object of type INTEGER that stores the number of saved views, N, in the data structure TsavedSequence. At line 156, N TsavedView data structures, designated m_savedViews[N], are also saved in TsavedSequence.

Referring to FIG. 8, pseudo code is listed describing a method of capturing a view shown on a screen. The method is executed by a function captureScreen. The function captureScreen accepts as an argument originalCINE_File. At line 202, the function storeScreen, which is executed by captureScreen, accepts originalCINE_File as an argument and stores its study and image UIDs in a DICOM_FILE designated screenShot in the pseudo code at line 202. Then, beginning at line 204 and ending at line 218, the characteristics of the view are stored in a series of steps.

First, a TsavedView data structure is filled as .indicated at line 206. The particular TsavedView that is filled is called mySavedView (line 208). A loop is executed from lines 210 to 214. As each view includes 4 windows, the loop begins with the windowID set equal to 0, and fills a TsavedWindow data structure for the window of the derived image having a window ID equal to 0. This particular TsavedWindow data structure is designated m_savedWindow[0]. As indicated at line 214, each m_savedWindow[windowID] is a member of my_savedview. The function fillSavedWindow(windowID) stores image data for the window designated by windowID in m_savedWindow[windowID]. Specifically, the data structure at m_savedWindow[0] is filled by filledSavedWindow(0).

In line 218, the TsavedView data structure my_SavedView is stored in the DICOM_IMAGE screenShot. Specifically, the function addSavedView incorporates the data structure mySavedView into screenShot. Now screenShot contains both the study and image UIDs—added at line 202, and the configuration of the orginalCINE_file required to show the view.

Referring to FIG. 9, pseudo code is listed describing how screenShot is replayed. The replayscreen function at line 220 accepts screenShot as an argument. ScreenShot includes the study and image UIDs of originalCINE. At line 224, the function getOriginal, which accepts screenShot as an argument, retrieves originalCINE using the study and image UIDs stored in screenShot. At line 228, the saved view is extracted from screenShot. Specifically, the function getSavedView retrieves the image data for the saved view from screenShot, and then stores this image data in my_SavedView, which is a data structure of type TsavedView.

Now that the data for originalCINE and for the saved view have been retrieved, the next step is to display the saved view. The CINE file is loaded in 3D mode, along with configuration information required to show the saved view. Specifically, at line 232, the function load3D, which accepts originalCINE, and mySavedView as arguments, loads originalCINE in 3D mode, and then configures originalCINE as required to display the view stored in mySavedView.

Referring to FIG. 10, pseudo code is listed describing the function captureSequence listed at line 234, which accepts the DICOM_IMAGE originalCINE as an argument. This function is analogous to the captureScreen function at line 200. As with the captureScreen function, the first step is to capture a view displayed. At line 238, the function storeScreen, accepts originalCINE_FILE as an argument and stores its study and image UID in screenShot. However, more than one view is stored in the sequence. At line 242, a data object savedViewBegin of type INTEGER stores an integer representing the first view in the sequence. SavedViewEnd at line 244 is a data object of type INTEGER that stores an integer representing the last view in the sequence. NumViews at line 246 is a data object of type INTEGER that stores the number of views in the sequence. As indicated at line 248, the TsavedSequence data structure in which the sequence is saved is designated mySavedSequence (numViews).

In order to save the sequence of views, the captureSequence function must loop through all the saved views, and, in each view, must loop through all the saved windows. Accordingly, in step 250, the function captureSequence loops through all of the views from savedViewBegin to savedViewEnd. For each savedView having a savedViewID between savedViewBegin and savedViewEnd, the capture sequence function loops through all of saved windows in that saved view as indicated at line 252. As indicated at line 254, all of the information is saved in mySavedSequence. Specifically, for each view in a sequence, the data structure m_savedviews for such view includes four TsavedWindow data structures, each of which stores information regarding one of the windows for that view. Then, the data structure mySavedSequence includes a number of TsavedView data structures, designated m_savedView[savedViewID] equal to numViews.

After the data structure mySavedSequence has been filled, the sequence that has been saved is added to the screenShot file. Specifically, the addSequence function listed at line 256 adds the data stored in mySavedSequence to the DICOM_IMAGE screenShot, so that screenShot now stores both the study and image UIDs of the primary CINE file as well as the data stored in mySaveSequence.

Referring to FIG. 11, pseudo code is listed describing a replaysequence function, which, as indicated at line 258, accepts screenShot as an argument. The first step in the function is to retrieve the primary CINE file. Accordingly, at line 260, a getorginal function accepts screenShot as an argument and retrieves originalCINE using the study and image UIDs stored in screenShot. Next, at line 262, the function getSavedSequence retrieves the sequence data stored in screenShot and loads it into mySavedSequence, a data structure of type TsavedSequence. The TsavedSequence is extracted from the screenShot. After the stored sequence has been retrieved and stored in mySavedSequence, the next step is to load the primary CINE file in 3D mode, and then to configure the primary CINE file to show the saved sequence. The function load3D at line 264 loads originalCINE, and incrementally manipulates the three dimensional image generated from originalCINE based on the configuration of the views stored in mySavedSequence. The steps in which the sequence are replayed are shown in lines 266 to 280. PlaySequence at lines 266 is a data object of type BOOLEAN that is set equal to TRUE to play the sequence. NumViews at lines 268 is a data object of type INTEGER that is set equal to numSavedViews stored in mySavedSequence. SequencePosition at line 270 is an INTEGER data object that indicates the current view in the sequence that is being shown. The SequencePosition data object continuously cycles from 0 to numViews−1, and then back to 0, to continuously play through the views stored in TsavedSequence. As indicated at line 272, this cycle continues while playSequence is equal to TRUE. Specifically, as shown at line 274, the function displaySavedView accepts sequencePosition as an argument and displays the view in the TsavedView indicated by sequenceposition. Then sequencePosition is incremented, as shown at line 276. When sequenceposition reaches a number equal to numViews, sequenceposition is set back equal to 0, and the loop continues until the object playSequence is set equal False.

By using these data structures and functions, the results of analysis can be transmitted or transported as derived, single frame, DICOM files along with originalCINE, so that when originalCINE is subsequently reviewed from a creenShot, the reviewers will be able to see what previous reviewers have done, and will be able to easily replay what previous reviewers have done by reconfiguring the three dimensional image generated from originalCINE. According to a preferred aspect of the invention, as many manipulations and resulting views as desired are saved, so that a complete record of the desired analysis is retained.

FIG. 3 shows a scanning station 20 that is electronically coupled to a review station 40. Preferably, the scanning station 20 and review station 40 are both part of a network of stations, each of which includes data processors and software enabling views to be saved and restored according to the present invention. Then, all the selected analysis performed by a technician at the scanning station 20 can be sent along with originalCINE to the review station. A user at the review station can then load and configure the CINE file after viewing the derived image. This also holds true for communication between review stations. Specifically, all of the selected analysis performed by a user at one review station may be saved and subsequently restored by a user at another review station. What constitutes a review station will differ markedly. For example, a review station could be a clinician's computer that accesses a particular patient's files at a review station or scanning station, along with the saved selections from that file, so that the clinician can replay these saved selections on the three dimensional image generated from the three dimensional file. Different stations need not be electronically coupled. Instead, orginalCINE and the stored selections could be transported from one station to another by other methods such as by being stored on a disk.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of storing and restoring for replay a selected view from a series of views of a three dimensional image generated from an image object, the three dimensional image being generated in an image coordinate set of a coordinate space, each image coordinate in the image coordinate set having an associated image property in the image object, the three dimensional image being configurable to sequentially make each view in the series of views viewable, the three dimensional image having an associated configuration for each view in the series of views, the method (currently amended) comprising the steps of:
  (a) manipulating the three dimensional image to display the selected view;
  (b) selecting the selected view;
  (c) storing the associated configuration for the selected view of the three dimensional image;
  (d) retrieving the image object; and retrieving the associated configuration for the selected view of the three dimensional image;
  (e) generating the three dimensional image in the coordinate space from the image object; and,
  (f) configuring the three dimensional image to have the associated configuration for the selected view to make the selected view viewable for further manipulation.

2. The method as defined in claim 1 wherein the associated configuration of the three dimensional image includes an associated geometry of the three dimensional image and,
  said step (c) comprises storing the associated geometry for the selected view of the three dimensional image;
  said step (d) comprises retrieving the associated geometry for the selected view of the three dimensional image; and,
  said step (f) comprises configuring the three dimensional image according to the associated geometry for the selected view of the three dimensional image to make the selected view viewable.

3. The method as defined in claim 2 wherein
  the associated configuration of the three dimensional image includes at least one display parameter and;
  said step (c) comprises storing the at least one display parameter for the selected view of the three dimensional image when the selected view is selected,
  said step (d) comprises retrieving the at least one display parameter for the selected view of the three dimensional image, and
  said step (f) comprises adjustably displaying the three dimensional image according to the at least one display parameter for the selected view of the three dimensional image.

4. The method as defined in claim 1 wherein
  step (b) comprises selecting a set of views from the series of views;
  step (c) comprises storing a set of associated configurations, each configuration in the set of associated configurations being the associated configuration of a view in the set of views, and each view in the set of views having an associated configuration in the set of associated configurations;
  step (d) comprises retrieving the set of associated configurations; and
  step (f) comprises configuring the three dimensional image to have the associated configuration for each view in the set of views to make each view in the set of views viewable.

5. The method as defined in claim 1 wherein
  said steps (a), (b) and (c) are conducted at a first station, and
  said steps (d), (e), and (f), are conducted at a second station;

the method further comprising the step of transferring the image object and information stored in said steps (b) and (c) from the first station to the second station.

6. A view-storing data structure for storing a selected view from a series of views of a three dimensional image generated from an image object having a unique identifier,
  the three dimensional image being generated in an image coordinate set of a coordinate space, each image coordinate in the image coordinate set having an associated image property in the image object,
  the three dimensional image being configurable to sequentially make each view in the series of views viewable, the three dimensional image having an associated configuration for each view in the series of views, the data structure comprising:
    an image identification object for storing the unique identifier of the image object; and
    a view object for storing the associated configuration of the selected view in the three dimensional image.

7. A data structure as defined in claim 6 wherein the view object comprises a selected point object for storing a selected point in the three dimensional image.

8. A data structure as defined in claim 6 wherein
  the associated configuration of the three dimensional image includes an associated geometry of the three dimensional image; and
  the view object comprises a set of geometry data objects for storing the associated geometry of the selected view of the three dimensional image.

9. A sequence-storing data object for storing a sequence of views from a series of views of a three dimensional image generated from an image object having a unique identifier,
  the three dimensional image being generated in an image coordinate set of a coordinate space, each image coordinate in the image coordinate set having an associated image property in the image object,
  the three dimensional image being configurable to sequentially make each view in the series of views viewable, the three dimensional image having an associated configuration for each view in the series of views,
  the data structure comprising a set of view-storing data structures as defined in claim 7, each view-storing data structure in the set of view-storing data structures storing the associated configuration of a view in the sequence of views.

10. The sequence-storing data structure as defined in claim 9 further comprising a view number data object for storing the number of views in the sequence.

11. A data processing system for storing and restoring for replay a selected view from a series of views of a three dimensional image generated from an image object,
  the three dimensional image being generated in an image coordinate set of a coordinate space, each image coordinate in the image coordinate set having an associated image property in the image object,
  the three dimensional image being configurable to sequentially make each view in the series of views viewable, the three dimensional image having an associated configuration for each view in the series of views;
  the data processing system comprising means for performing the steps of;
    (a) manipulating the three dimensional image to display the selected view;

(b) selecting the selected view;
(c) storing the associated configuration for the selected view of the three dimensional image;
(d) retrieving the image object; and the associated configuration for the selected view of the three dimensional image;
(e) generating the three dimensional image in the coordinate space from the image object; and,
(f) configuring the three dimensional image to have the associated configuration for the selected view to make the selected view viewable for further manipulation.

12. The system as defined in claim 11 wherein
the associated configuration of the three dimensional image includes an associated geometry of the three dimensional image and,
said step (c) comprises storing the associated geometry for the selected view of the three dimensional image;
said step (d) comprises retrieving the associated geometry for the selected view of the three dimensional image; and,
said step (f) comprises configuring the three dimensional image according to the associated geometry for the selected view of the three dimensional image to make the selected view viewable for further manipulation.

13. The system as defined in claim 12 wherein
the system is a networked system including a first d a processor station and a second data processor station;
the system comprises means for transferring the image object and information saved in said step (c) from the first station to the second station.

14. The system as defined in claim 11 wherein
step (b) comprises selecting a set of views from the series of views;
step (c) comprises storing a set of associated configurations, each configuration in the set of associated configurations being the associated configuration of a view in the set of views, and each view in the set of views having an associated configuration in the set of associated configurations;
step (d) comprises retrieving the set of associated configurations; and
step (f) comprises configuring the three dimensional image to have the associated configuration for each view in the set of views to make each view in the set of views viewable.

15. A computer program product for use on a computer system to store and restore for replay a selected view from a series of views of a three dimensional image generated from an image object,
the three dimensional image being generated in an image coordinate set of a coordinate space, each image coordinate in the image coordinate set having an associated image property in the image object,
the three dimensional image being configurable to sequentially make each view in the series of views viewable, the three dimensional image having an associated configuration for each view in the series of views;
the computer program product comprising:
a recording medium;
means recorded on the medium for instructing the computer system to perform the steps of:
(a) manipulating the three dimensional image to display the selected view;
(b) selecting the selected view;
(c) storing the associated configuration for the selected view of the three dimensional image;
(d) retrieving the image object and the associated configuration for the selected view of the three dimensional image;
(e) generating the three dimensional image in the coordinate space from the image object; and,
(f) configuring the three dimensional image to have the associated configuration for the selected view to make the selected view viewable for further manipulation.

16. The computer program product as defined in claim 15 wherein
the associated configuration of the three dimensional image includes an associated geometry of the three dimensional image and,
said step (c) comprises storing the associated geometry for the selected view of the three dimensional image;
said step (d) comprises retrieving the associated geometry for the selected view of the three dimensional image; and,
said step (f) comprises configuring the three dimensional image according to the associated geometry for the selected view of the three dimensional image to make the selected view viewable.

17. The computer program product as defined in claim 15 wherein
step (b) comprises selecting a set of views from the series of views;
step (c) comprises storing a set of associated configurations, each configuration in the set of associated configurations being the associated configuration of a view in the set of views, and each view in the set of views having an associated configuration in the set of associated configurations;
step (d) comprises retrieving the set of associated configurations; and
step (f) comprises configuring the three dimensional image to have the associated configuration for each view in the set of views to make each view in the set of views viewable.

18. A method of storing and reloading data from a storage medium for a three dimensional image generated from an image object, the method comprising the steps of:
displaying a view of said three dimensional image;
manipulating said three dimensional image to display a selected view using at least one user-selected configuration parameter, said selected view being a configuration of said three dimensional image based upon said user-selected configuration parameter;
saving, in the storage medium, said user-selected configuration parameter used to configure said three dimensional image into said selected view; and
retrieving said three dimensional image and said user-selected configuration parameter from said storage medium and automatically re-manipulating said three dimensional image into said selected view to allow for further manipulation.

19. The method claimed in claim 18, wherein said step of saving includes storing a data structure, said data structure including an image identification object for storing a unique identifier of the image object, and a view object for storing said configuration parameter.

20. The method claimed in claim 18, wherein said user-selected configuration parameter includes a geometric parameter for the three dimensional image.

21. A system for storing and reloading data for a three dimensional image generated from an image object, said system comprising:

a storage medium for storing said three dimensional image as a file;

display means for displaying a view of said three dimensional image;

image processing means for manipulating said three dimensional image to display a selected view using at least one user-selected configuration parameter, said selected view being a configuration of said three dimensional image based upon said user-selected configuration parameter;

saving means for saving, in said storage medium, said user-selected configuration parameter used to configure said three dimensional image into said selected view; and retrieving means for retrieving said three dimensional image and said configuration parameter from said storage medium and automatically re-manipulating said three dimensional image into said selected view to allow for further manipulation.

22. The system claimed in claim 21, wherein said saving means includes means for storing a data structure, said data structure including an image identification object for storing a unique identifier of the image object, and a view object for storing said user-selected configuration parameter.

23. The method claimed in claim 21, wherein said user-selected configuration parameter includes a geometric parameter for the three dimensional image.

* * * * *